R. FIELD.
CASH REGISTER.
APPLICATION FILED SEPT. 15, 1914.
1,149,903.
Patented Aug. 10, 1915.
5 SHEETS—SHEET 1.
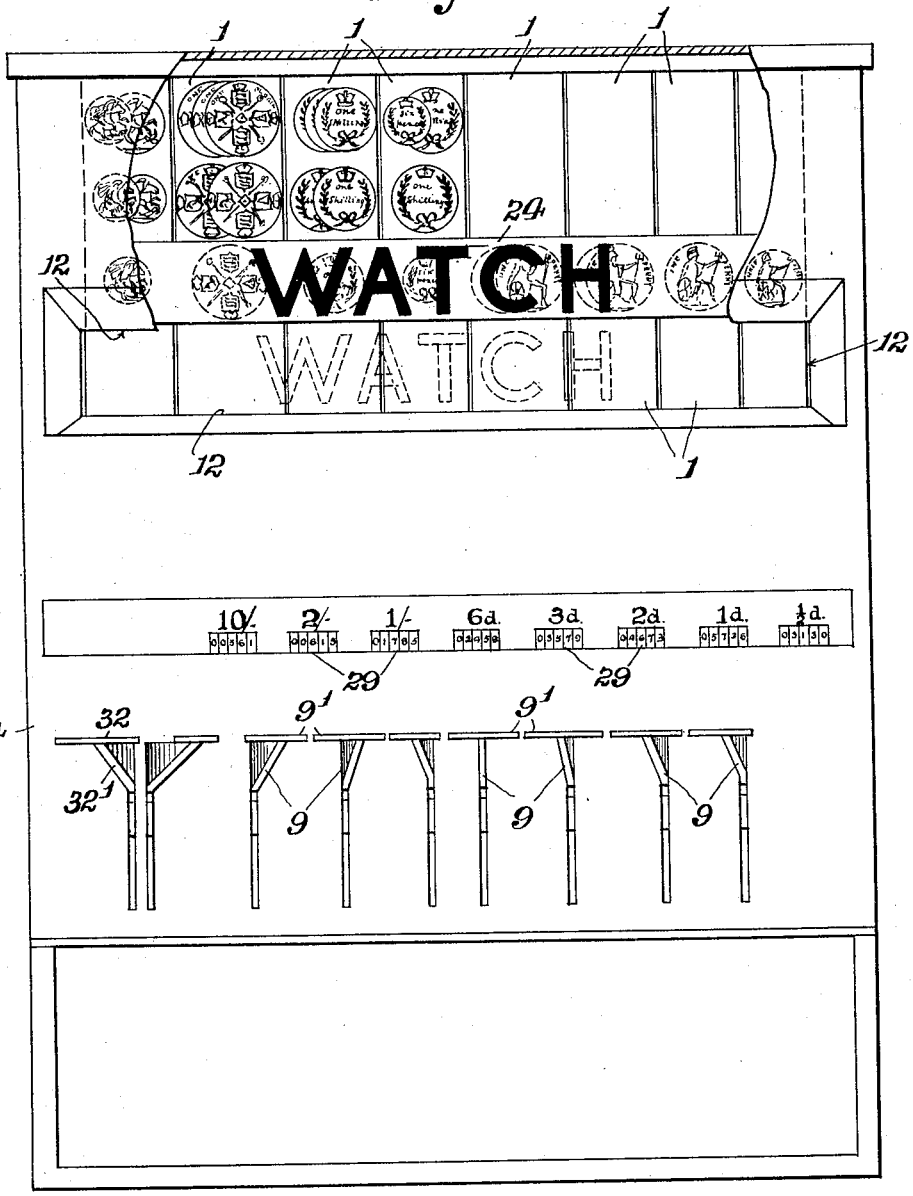

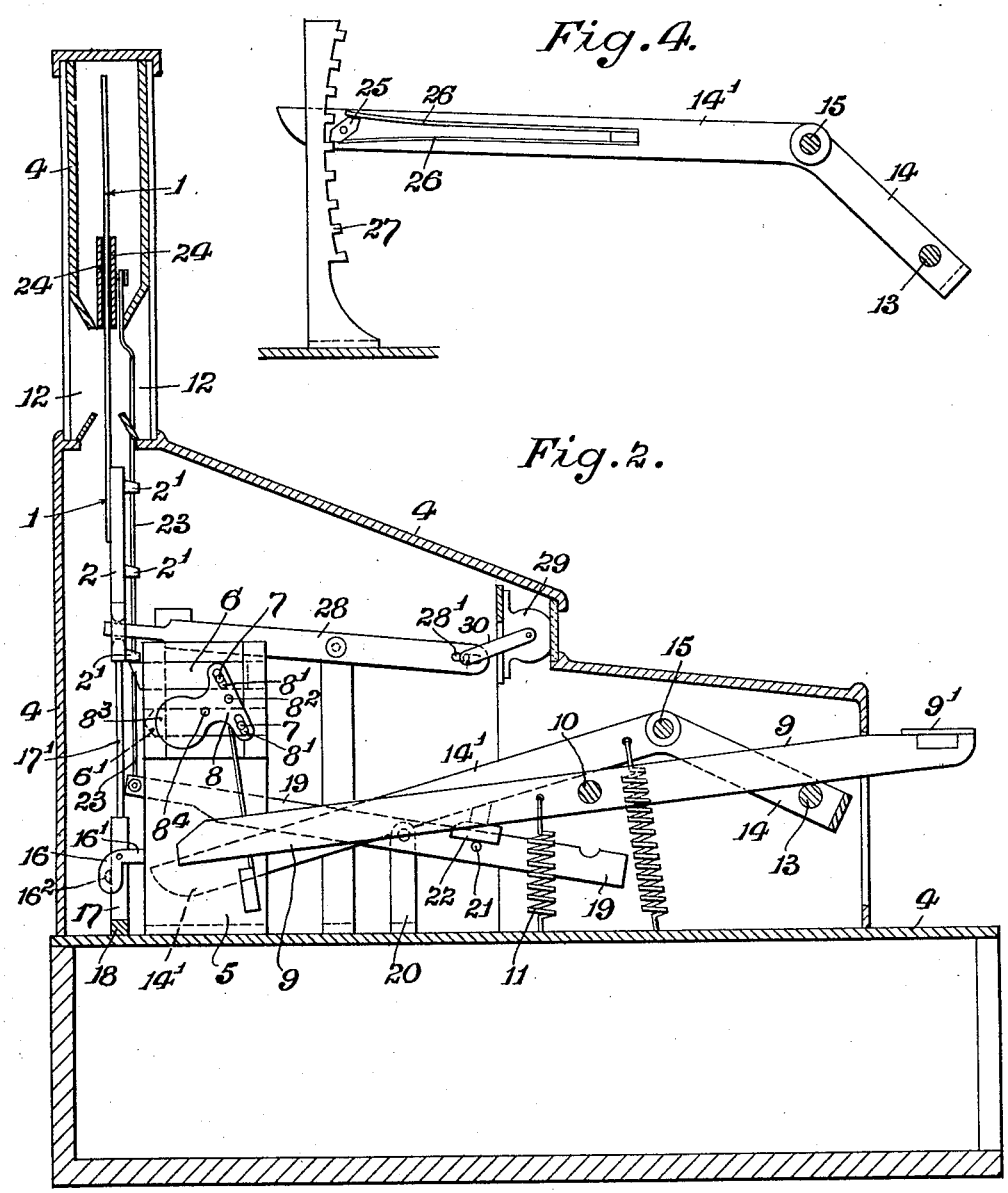

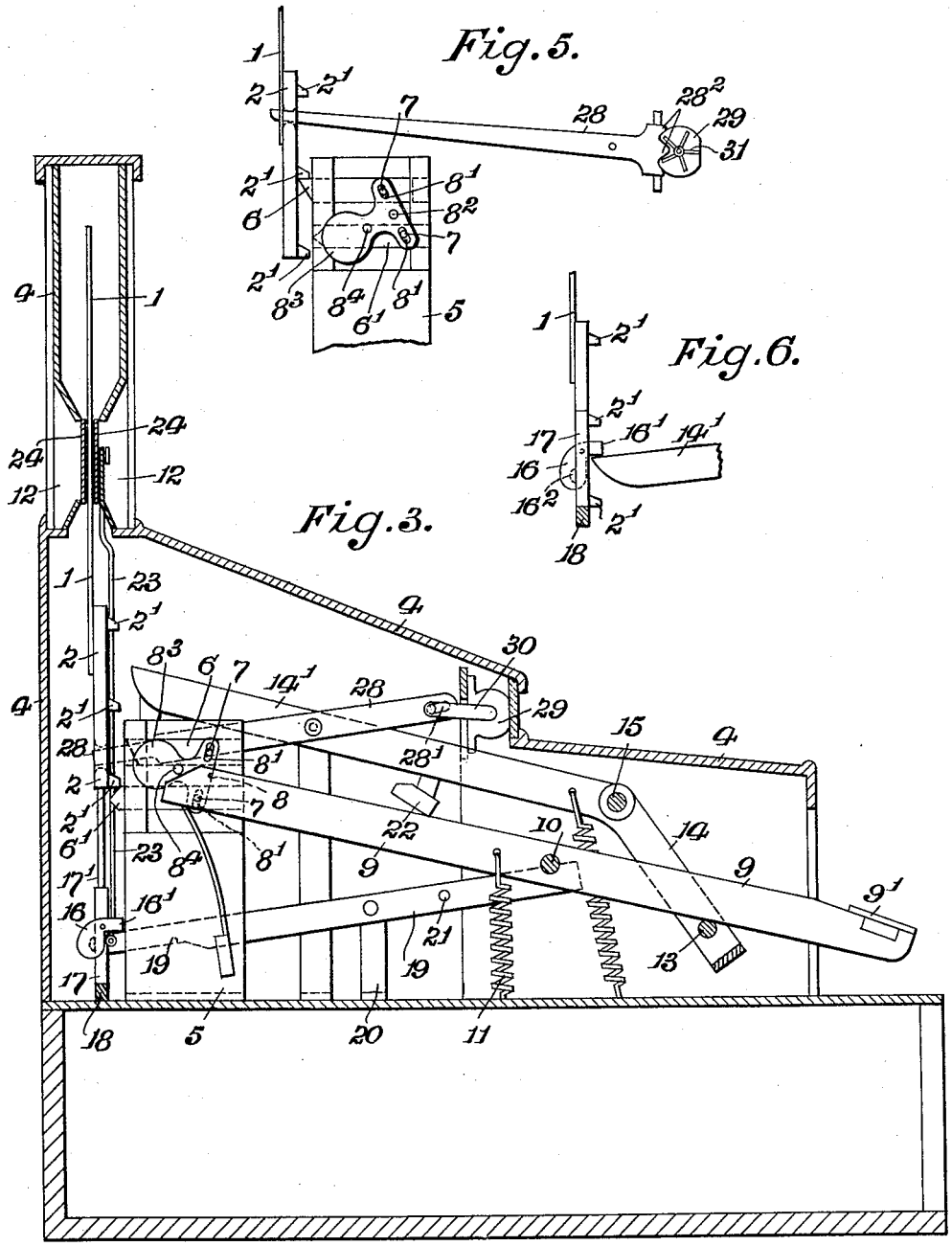

R. FIELD.
CASH REGISTER.
APPLICATION FILED SEPT. 15, 1914.

1,149,903.

Patented Aug. 10, 1915.
5 SHEETS—SHEET 4.

Witnesses,
Wm. H. Bates
Grattan Purcell

Inventor
Robert Field
by Herbert W. T. Jenner
Attorney.

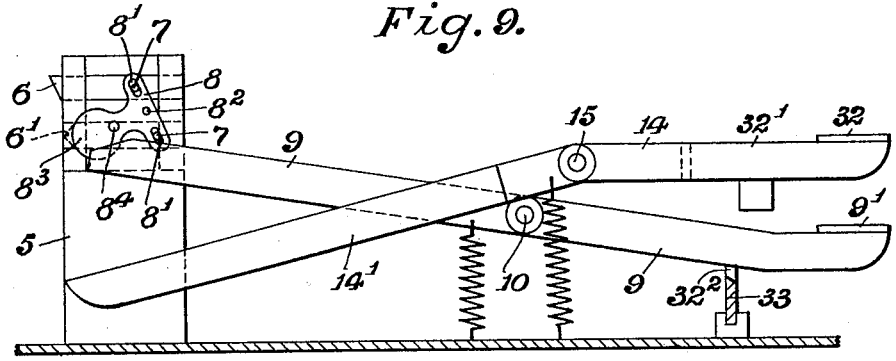
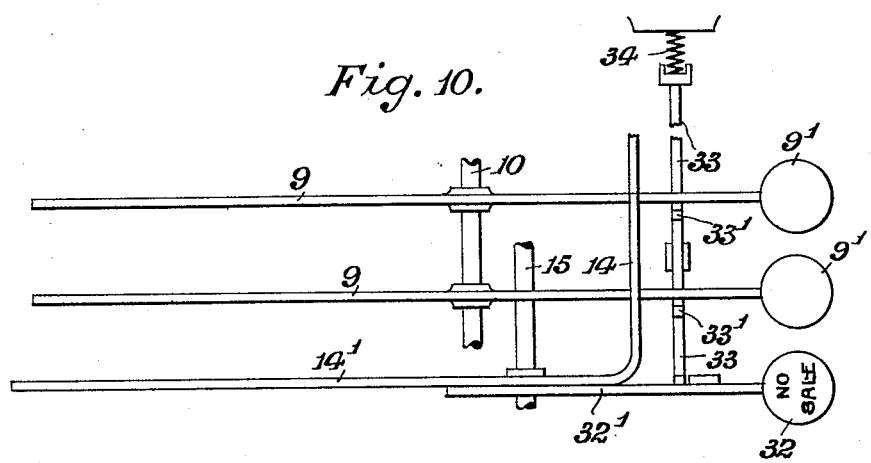

UNITED STATES PATENT OFFICE.

ROBERT FIELD, OF HUDDERSFIELD, ENGLAND.

CASH-REGISTER.

1,149,903. Specification of Letters Patent. Patented Aug. 10, 1915.

Application filed September 15, 1914. Serial No. 861,787.

*To all whom it may concern:*

Be it known that I, ROBERT FIELD, a subject of King George V of Great Britain, residing at Huddersfield, in the county of York, England, have invented certain new and useful Improvements in Cash-Registers, of which the following is a specification.

This invention relates to cash registers of the type in which depression of a key or keys causes the amount of the purchase to be moved up into view of the purchaser and comprises the provision of an improved cash register in which the number of keys required is minimized, the mechanism simplified and cheapened and the amount of each purchase exhibited in a novel and attractive manner.

According to my invention, I employ a series of sliding cards, boards or the like having thereon representations of coins or other indications for which the respective operative keys stand, either a single representation of the coin or amount of two or more representations of increasing amounts one above the other, each card or the like being adapted to move or slide downwardly when the respective keys are operated to bring the representations opposite a sight hole or space, a card or slide being movable vertically to present and then withdraw a word or indication designed to draw attention to the said sight hole or space and to the amount of the purchase brought into sight by the operation of a key or keys.

In the means referred to the vertically movable slides or the like and their descent to exhibit the amount of the purchase to view, differ from the ordinary sale tickets which are moved upwardly when the respective keys are actuated and I provide for the doubling or further multiplication of the amount which can be exhibited by any single slide or the like, a result which has not previously been obtained.

Novel means are provided to effect the step by step descent of the sliding cards and their restoration to normal position, and means are also provided to effect the presentation and withdrawal, opposite and away from the sight hole, of the device for attracting the purchaser's attention; to register the number of operations of each key; and to guard against fraud by insuring that once a key commences to move in either direction the movement must be completed before the parts can resume their normal positions.

In describing my invention I shall refer to the accompanying drawings, in which:—

Figure 7:
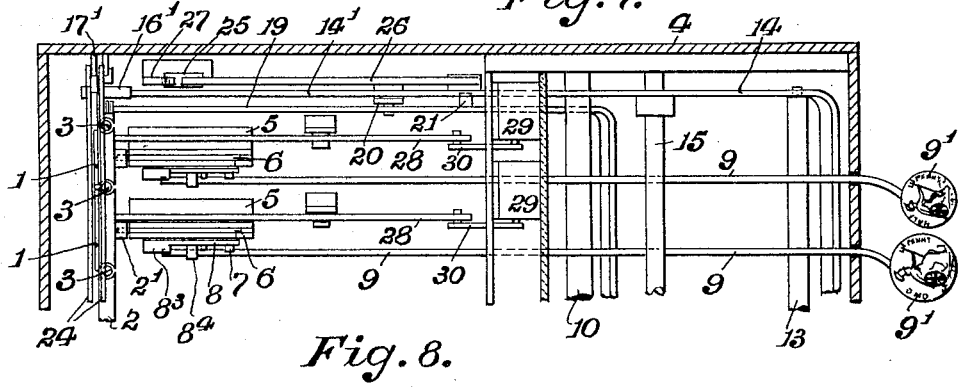
Figure 8:
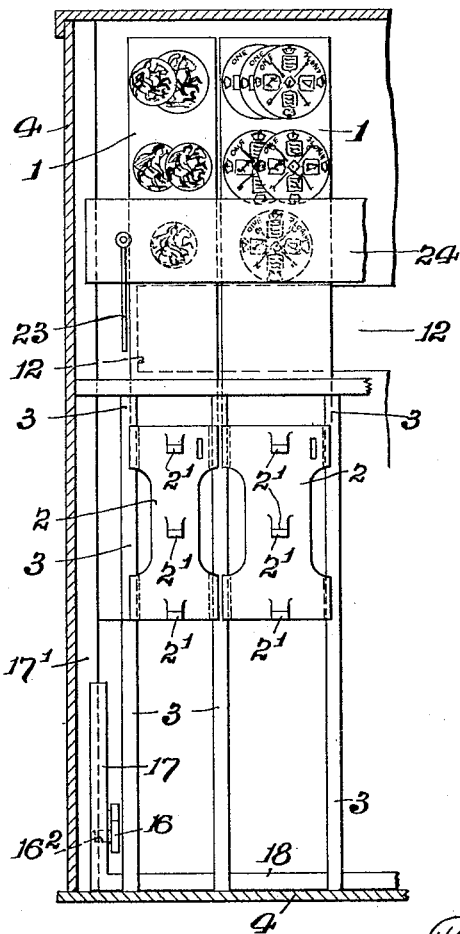

Figure 1 is a rear elevation of a cash register constructed according to and embodying my invention, part of the upper portion of the casing being broken out for the sake of clearness; Fig. 2 is a vertical sectional side elevation of the register showing the parts in their normal positions; Fig. 3 is a similar view showing the positions of the parts when a key has been depressed and has reached the downward limit of its movement; Fig. 4 is a detail illustrating the means for insuring full movement of a key; Fig. 5 is a detail showing a sliding card plate dropped one step, and showing also the means for registering the number of operations of a key as applied to those keys which are or may be required to be actuated twice or more times in succession; Fig. 6 is a detail illustrating the method of raising the sliding cards to normal position after they have been dropped by the actuation of their keys; Fig. 7 is a partial plan view of the mechanism; Fig. 8 is a detail showing in rear elevation the sliding cards and plates and the guides therefor, and Figs. 9 and 10 are details illustrating a modification hereinafter referred to.

Referring to the drawings, the series of sliding cards or the like bearing representations of coins or other indications of given values are represented at 1, 1, and they are secured to respective metal or like plates 2, 2, adapted to slide vertically between guides 3, 3, suitably supported within an inclosing casing 4. Each plate 2 has on one face thereof a suitable number, in this instance three, of projections or ribs 2'. Adjacent or opposite each plate is a suitable bracket 5 supporting two horizontally slidable bars or latches 6, 6', each of which has a laterally projecting pin 7 extending through respective slots 8', 8', in a T or double-armed lever 8, pivotally secured at $8^2$ to the bracket and weighted at $8^3$ on the side of the pivot opposite to the slots 8', 8'. Normally, the weighted part of the lever causes it to move the upper sliding bar or latch 6 forwardly, as shown in Fig. 2, and causes it to extend under the lowest projection 2' on its plate 2 and support said plate in its uppermost or fully raised position.

A series of key levers 9, one for each indicator card, are loosely mounted on a spindle or rod 10 extending across the register and supported at its ends by the casing or by suitable brackets. Depression of a key lever, by engagement with a laterally projecting pin $8^4$ on the corresponding weighted lever 8 causes the said lever 8 to be rocked in one direction, to withdraw its upper catch bar 6 from beneath the lowest projection 2' on its respective sliding plate and place the lower catch bar into the path of the projections on the plate, so that the said plate is permitted to drop a certain distance and be then supported by the lower catch bar as shown at Fig. 3, the removal of finger pressure from the key lever permitting the latter to be returned by a spring 11, or by gravity, to its normal position, in doing which the weighted lever 8 is released and caused by the weight thereon to assume its original position, whereby the upper catch bar 6 is moved back into a position beneath the next or second projection on the sliding plate and the lower catch bar is withdrawn, so that the plate is allowed to drop the remainder of the distance between the first and second ribs or projections, and be then supported by the top catch bar again in a position one step lower than its original position. Successive actuations of a key lever allow its sliding plate to fall step by step and be supported by the engagement of the upper catch bar with successive projections 2' as will be understood. This arrangement enables me to provide for the exhibition opposite a sight hole 12 of the amount for which the key stands, or of an amount representing two or more multiples of such primary amount, by the presentation opposite the sight hole of a second or third portion of the card 1. Each sliding card has a key mechanism as above set forth.

Under the key levers 9 extends a roller or bar 13 supported at each end in bearings in a frame 14 pivotally mounted on a rod 15 extending across the register and having side portions such as 14' which extend forwardly toward the front of the machine one at each side thereof. The frame 14 is returned to normal position by a spring or springs. The extremities of these side portions 14', 14', extend into the path of tumbler levers such as 16, pivotally mounted on respective side uprights such as 17 adapted to slide on a guide rib 17' at each side of the machine. The lower ends of the uprights 17, 17, carry between them a cross bar 18 which for the purposes of description may conveniently be termed the zero bar.

The depression of any one of the key levers, rocks the frame 14 and causes the forwardly extending side portions 14', 14', to engage with extensions such as 16' on the respective tumbler levers 16 and the latter, being held from movement in one direction by the engagement of lateral pins such as $16^2$ thereon with the respective uprights, continued upward movement of the free ends of the side frames carries the uprights and zero bar upwardly for a given distance, that is to say, until such sliding plates as may have been dropped, have been raised back to normal position, when, through the arc of movement described by the said side frames, the ends thereof pass clear of the extremities of the extensions 16' on the tumbler levers and allow the uprights and zero bar to drop back to the normal or lowest position. When the side frames or levers drop back to normal position, they rock the tumbler levers on their pivots and pass beyond the extensions 16', whereupon the said levers fall back again into their normal positions with the extensions 16' above or in the path of upward movement of the side frames ready to be engaged by the latter on the next depression of a key.

At each side of the register I provide a lever or arm such as 19 pivotally carried by a suitable bracket such as 20 and having a laterally projecting pin such as 21 extending out into the path of an engaging member 22 on the respective side frame. The forward ends of the arms 19 are suitably connected, as by wires or the like such as 23, with a hollow sliding device 24, comprising a pair of bars or strips extending one on each side of the sliding indicator cards 1. As the side frames rise on depression of a key, the engaging members thereon are lifted away from the pins 21 on the levers 19, which are therefore left free to rock on their pivots. The weight of the sliding device 24, either alone or assisted by a spring or springs causes it to descend and be presented opposite the sight hole 12 as shown in Fig. 3. The downward motion of the device may be limited by the rear ends of the levers or arms 19 contacting with the rod or spindle 10 on which the key levers are mounted, as shown in Fig. 3. The device 24 has printed thereon a word or words, as for instance the word "watch" as shown in Fig. 1, calculated to direct the attention of a purchaser to the space formed by the sight hole.

As the side frames descend, on release of the depressed key or keys, the engaging members 22 on said side frames contact with the pins 21 on the arms 19 and depress the rear ends of said arms thus causing the device 24 to be elevated clear of the sight hole and withdrawn from view. This presentation and withdrawal of the device 24 for arresting the purchaser's attention takes place at each actuation of a key or keys, and the withdrawal is not effected, as will be understood, until the sliding card or cards corresponding to the key or keys depressed, has or have been allowed to drop and present opposite the sight hole an indication of the amount being registered. Immediately the key or keys is or are released and allowed to return to normal position, the device 24 is withdrawn and, the attention of the purchaser having been already directed to the sight hole by the presentation of the device, the record or indication of the amount registered, which is exposed by the return of the device 24 to normal position cannot fail to be observed.

In order to prevent any incomplete movement of the parts which might lead to fraud, I provide each of the side frames 14' near its forward end with a pivoted finger or catch such as 25, see Fig. 4, which is acted upon by springs such as 26 so as to be movable on its pivot within certain limits. Opposite and in the path of each catch 25 is a serrated or toothed fixed segment 27 over the teeth of which the catch will ride idly in either direction of movement of the side frames. As the side frames commence to rise on depression of a key, the engagement of the segment with the catch tilts said catch to an angle as shown at Fig. 4, in which position it is held by the springs 26. If any attempt is made to return the key lever before it has received its full movement, the point of the catch 25 will engage with a tooth of the segment, and as said finger cannot move any farther on its pivot in that direction, the parts are prevented from return movement and it is essential for the key lever to be actuated to its full extent to admit of the parts returning to normal position. In like manner, on the descending movement of the side frames the finger is moved to the opposite angle by engagement with the segment and rides idly over the teeth as the frames descend. Any attempt to move the side frames back to abnormal position previous to reaching the full extent of their return movement is prevented by the finger or catch engaging a tooth of the segment and preventing upward movement.

Since the warning device 24 is exposed to view immediately a key commences its downward movement, the partial depression only of a key, and its release without having completed its full movement, fails to return the warning device to normal position. Another feature is that the catch 25 does not leave or move clear of the segment 27, in the upward movement of the side frames, until the dropped cards have been returned to the zero position and in the downward movement of the side frames the catch does not clear the segment until the extremities of the said side frames have passed or become positioned beneath the tumbler levers 16.

Engaging with each sliding plate 2 is a pivoted lever 28 whose opposite end is adapted to actuate a counter or adding device 29 at each downward movement of the said plate to register the number of operations of the corresponding key. For those plates whose cards only require to be dropped one step, the lever 28 may have a slot 28' in which registers a pin on an arm 30 fast on the actuating spindle of the counter, as shown in Figs. 2, 3 and 7. In the case of those plates 2 whose cards or indicators are required to be capable of dropping two, three, or more times, the counter spindle may have a star or like wheel 31 as shown in Fig. 5, and the arm or lever 28 have a number of segmental teeth 28² adapted to engage the teeth of the star wheel and give a partial rotation thereto at each descent of the plate. When the lever 30 or the star-wheel 31 are keyed on the shaft of the counter, so that the said shaft is oscillated back and forth, the counter is provided with any approved mechanism, such as a ratchet wheel and pawl, which will permit the counting disks to be revolved in one direction only. The counters may register say, up to five figures as shown, and by the subtraction, from the recorded figures, of the figures previously recorded in the several counters, the precise amount which has been taken over any period can readily be ascertained. In the instance shown, the register has eight keys, representing ten shillings, two shillings, one shilling, sixpence, threepence, twopence, one penny and one halfpenny. Of these, only the first four need have their cards provided with more than the key value amount they represent and I show these four as having two additional indications, representing respectively double and treble the key value. By varying combinations in the use of the keys any purchase up to double or more of the total represented by the face value of said keys or combinations thereof can be obtained. It will be understood, of course, that I may vary the numbers or values of keys employed, and that any or all of the keys may be arranged to be actuated successively to give an indication of as many times its face value as may be desired.

The cards or indicators 1 are preferably printed, impressed or otherwise marked with more or less exact representations of a coin or coins to the amount required, as shown in Figs. 1 and 8, or these may be given in figures or otherwise. An additional or "no sale" key 32 is provided, the lever of which is simply mounted loosely on the pivot rod 10 and has no other action beyond rocking the frame 14 and actuating the zero bar. This key enables any exposed cards or indicators to be withdrawn from view and raised back to normal position, and also enables the side frames 14' to be maintained in their raised position as shown in Fig. 3 to permit of any key or combination of keys being actuated a number of times in succession.

Ordinarily the actuation of a key lever lifts the zero bar and raises any dropped cards back to their highest positions. If therefore, the same key is to be depressed two or more times successively to drop a card two or three steps, the side frames are held by the key 32 in inoperative position until the full amount desired has been registered, when the key 32 is released and the side frames drop back beneath the tumbler levers ready to lift the zero bar and clear the sight hole at the next key actuation, to allow of the exhibition of the amount being registered.

With the above described arrangement, the extent of movement of the keys must be considerable, in order to admit, in the case of a single actuation of a key, of the side frames being moved the distance necessary to elevate any cards dropped at the previous registration. In order that the movement of a key may only be small and repetition of that key be therefore rendered quicker, I may adopt the arrangement shown at Figs. 9 and 10. In this instance, the key levers are arranged to have only the amount of movement necessary to operate the levers 8. Normally the key levers rest on the upper surface of a grooved bar 33 and are locked thereby. The "no sale" key lever 32' is attached directly to the frame 14, and the roller 13 is dispensed with. A projection 32² on the "no sale" key lever is adapted, on depression of the "no sale" key, to engage the bar 33 and move it endwise against the action of a spring 34, thus presenting the grooves 33' in the bar beneath the key levers and permitting them to be moved. In the arrangement previously described, the "no sale" key lever was only operated to clear the sight hole, or to permit of successive actuations of a key or keys. In the present instance, since the "no sale" key alone controls the zero bar, such key is depressed at every registration, and held depressed if a key or series of keys is to be actuated two or more times successively.

The keys of the register are preferably formed, as shown at 9' in Fig. 7, as facsimiles of the coins or amounts they represent, and the corresponding cards 1 also preferably bear facsimile representations of the coin or amount and if necessary of multiples thereof. This arrangement facilitates manipulation of the keys and also presents to the purchaser a more impressive or attractive indication of the amount registered.

The details of construction and arrangement of the parts can be varied or modified without departing from the spirit and scope of my invention, and the register can be made of various dimensions according to the number of keys employed.

Having thus described my invention, what I claim as new and desire to secure by Letters Patent is:—

1. In a cash register, the combination, with an indicating slide provided with projections, of a pair of latches arranged to slide in opposite directions crosswise of the said slide and to engage alternately with the said projections so that the slide is constrained to descend in successive steps, and a key lever and intermediate mechanism for reciprocating the said pair of latches.

2. In a cash register, the combination, with a vertical indicating slide provided with projections, of a support, a pair of latches arranged one above the other and slidable horizontally in the support and adapted to engage with the said projections, a pivoted tumbling lever operatively connected with the latches and constraining them to slide in opposite directions, and a pivoted key lever for operating the tumbling lever.

3. In a cash register, the combination, with an indicating slide provided with projections, of a pair of latches arranged to slide crosswise of the said slide and to engage with its projections, said latches being provided with laterally projecting pins, a pivoted tumbling lever provided with slots which engage with the said pins so that the latches are constrained to slide in opposite directions, means for moving the tumbling lever automatically in one direction, and a pivoted key lever operating to move the tumbling lever in the reverse direction.

4. In a cash register, the combination, with an automatically depressible indicating slide provided with projections, of a latch mechanism adapted to engage with the said projections and normally supporting the slide, and a key lever operatively engaging with the latch mechanism and permitting the slide to descend step by step at successive downstrokes of the key lever.

5. In a cash register, the combination, with a series of vertically slidable slides, latch mechanisms for supporting the slides, and a series of pivoted key levers operatively engaging with the respective latch mechanisms; of a zero bar for raising the slides, pawls pivoted at the end portions of the zero bar, and a pivoted frame operated by any one of the key levers and provided with arms which engage with the said pawls and raise the zero bar to reset the slides, and which also liberate the pawls to let the zero bar descend, during the first part of the down stroke of the key lever and before it actuates the latch mechanism and releases the slide pertaining to it.

6. In a cash register, the combination, with a series of vertically slidable indicating slides, of a zero bar for raising the slides, pawls pivoted at the end portions of the zero bar, and a pivoted frame provided with arms which when raised engage with the pawls and raise them and the zero bar to reset the slides, then automatically release the pawls and permit the zero bar to descend, and which finally repass the said pawls when permitted to descend to their original positions.

7. In a cash register, the combination, with a series of vertically slidable indicating slides, of a zero bar for raising the slides, pawls pivoted at the end portions of the zero bar, a pivoted frame provided with arms which when raised engage with the pawls and raise them and the zero bar to reset the slides, curved rack bars arranged concentric with the pivot of the said arms, and reversible spring-controlled catches pivoted to the said arms and engaging with the rack bars and preventing the arms from making incomplete strokes.

8. In a cash register, the combination, with a series of indicating slides each provided with projections, latch mechanisms adapted to engage with the said projections and normally supporting the slides, and pivoted key levers controlling the latch mechanisms; of a pivoted frame operated by any one of the key levers, a shutter sliding parallel to the indicating slides, pivoted levers and rods operatively connecting the shutter with the said frame, said shutter being adapted to descend automatically when any one of the key levers is depressed, and being raised by the said frame and levers when the key lever is not depressed.

9. In a cash register, the combination, with a series of indicating slides each provided with projections, latch mechanisms adapted to engage with the said projections and normally supporting the slides, and pivoted key levers controlling the latch mechanisms; of a pivoted frame provided with a crossbar at one end portion which is arranged under the corresponding end portions of the key levers, said frame having arms which project parallel to the other end portions of the key levers, a shutter sliding parallel to the indicating slides, pivoted levers having projections on one end portion which are pressed downwardly by the said arms when the key levers are raised, and rods connecting the other end portions of the pivoted levers with the shutter, said shutter being permitted to descend automatically when any key lever is depressed, and being raised when the key lever ascends.

In testimony whereof I affix my signature in the presence of two witnesses.

ROBERT FIELD.

Witnesses:
WALTER SCHOFIELD,
ELSIE M. GLEDHILL.

Copies of this patent may be obtained for five cents each, by addressing the " Commissioner of Patents, Washington, D. C."